United States Patent Office 3,096,284
Patented July 2, 1963

3,096,284
METHOD OF PREPARING GELLED AQUEOUS FLUID
Ralph L. Slate, Duncan, Okla., assignor to Halliburton Company, a corporation of Delaware
No Drawing. Filed July 5, 1960, Ser. No. 40,573
13 Claims. (Cl. 252—8.55)

This invention relates to fluid compositions used in well operations and more particularly it relates to a method whereby the viscosity of well treating fluids contaminated with borates can be increased.

In the art of fracturing oil and gas wells, a special fluid composition (usually called the fracturing fluid) is pumped down the well in contact with the formation to be fractured and then the pressure of the fluid composition is increased until the formation is fractured by hydraulic pressures. A fluid composition widely used in fracturing operations consists of a gum such as guar gum and water. When these two materials are mixed together in proper proportions a rather viscous gel is formed. In practice the guar gum is added to the water in the form of a dry powder and upon hydration forms gels of varying viscosities, the actual viscosity of the resulting composition being dependent upon the relative proportions of water and gum. Other things being equal, the viscosity of the resultant composition varies directly with the amount of gum used. Although the foregoing method possesses many desirable features, it is not entirely satisfactory. The latter is true because more or less frequently it has been found that the well treating fluids are contaminated with certain materials which will prevent gel formation. When such a condition is encountered it has been necessary, heretofore, to employ other types of fluids as the fracturing medium; a modification that increases costs.

It is, therefore, a principal object of the present invention to provide a method of preparing a fluid composition useful in fracturing operations which will obviate the disadvantages of the prior art processes. It is another object of my invention to provide a process whereby the viscosity of well treating fluids, regardless of the presence of borates therein, can be increased. Another object of this invention is to provide a process whereby the viscosity of well treating fluids can be increased by a method which is simple and economical. Other objects and advantages of the invention will become apparent as the description proceeds.

To the accomplishment of the foregoing and related ends, this invention then comprises the features hereinafter fully described and particularly pointed out in the claims, the following description setting forth in detail certain illustrative embodiments of the invention, these being indicative, however, of but a few of the various ways in which the principle of the invention may be employed.

In its broadest aspect, the invention comprises the addition to those well treating fluids which have borate present that normally prevent the formation of a gel when a gum is added thereto, a material which forms a water soluble complex with the borate.

While I do not wish to be bound by any particular theory as to how or why my desirable results are attained, it is believed that the following is substantially correct. As a result of my investigations, I have found that it is the presence of borates that inhibit, if not prevent entirely, the formation of a gel when the gum is added. Borates on hydrolysis generally produce a basic solution which may be illustrated equationwise using borax as the specific borate.

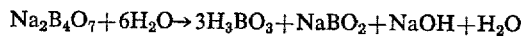

These borate ions inhibit the hydration of the gum and that effect is enhanced by the alkalinity of the system. The borate ions may be sequestered by adding a complexing agent to the solution. This reaction may be illustrated equationwise without attempting to balance the equation using a poly hydroxy alcohol as the specific sequestering agent.

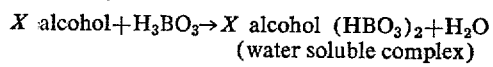
(water soluble complex)

Before proceeding with a specific example illustrating my invention, it may be well to indicate in general the nature of the materials and conditions required in the process.

Suitable materials forming water soluble complex compounds with the borates are those wherein the complex so formed is more stable than the complex formed between the borate and the gum. Specific complexing agents falling within this classification include: dulcitol, d-sorbitol, mannitol, glucose, glycerol, ammonium bifluoride and alkali metal fluorides.

Borates present in the well treating fluids include the alkali metal and the alkaline earth metal borates. Sodium borate or borax as it is generally known is the most prevalent.

Suitable gums for use in my invention include any of the gums which are used for forming a gel of which the product known as guar flour is particularly applicable for use in the process. For further information as to this particular compound and other suitable gums for use in the invention reference is made to U.S. Patent 2,854,407 dated Sept. 30, 1958.

As to the amount of complexing agent added, that should be at least equal on a chemical equivalent basis to the quantity of borate present. Since well treating fluids rarely contain more than 0.1 percent borate, an equivalent quantity (about 0.1 percent) of the complexing agent is generally sufficient. A greater quantity of the complexing agent may, of course, be used but no material advantage is attained thereby.

As pointed out above, alkalinity enhances the inhibitory effect of the borate and as a consequence anything that reduces the basicity of the solution improves gelling properties. For that reason, I prefer to add a buffering agent to the solution. Any of the buffering agents normally used to reduce basicity may be used of which sodium dihydrogen orthophosphate is an example. It is preferred to adjust the pH to a value within the range of about 7.0 to 8.0.

In order to disclose the nature of the present invention still more clearly, the following illustrative examples will be given. It is to be understood that the invention is not to be limited to the specific conditions or details set forth in the examples except insofar as such limitations are specified in the appended claims.

In all the examples, 0.1% borax solution was made using tap water. The pH of this solution was measured and found to be 9.2. In all of the following experiments, the complexing agent was added before the gum and mixed well with the borax solution to effect the solution of the agent. After addition and dissolving of the complexing agent the gum was added (1%) and the solution mixed well. The borax-complexing agent-gum system was observed and results recorded. The results are shown in the following tests. Sodium di-H ortho phosphate ($NaH_2PO_4$—$2H_2O$) was the agent added to adjust the pH, of the pH adjusted experiments.

0.1% borax (100 mls.)+1% guar gum used in each sample.

EXAMPLE NO. 1

*Ammonium Bifluoride Experiment*

| Test No. | Percent $NH_4HF_2$ | pH Original | pH After Buffering | Results |
|---|---|---|---|---|
| 1 | 0.0 | 9.0–9.2 |  | No gel. |
| 2 | 0.1 | 9.0–9.2 | 5.0 | Good gel. |
| 3 | 0.2 | 9.0–9.2 | 3.6 | Do. |
| 4 | 0.3 | 9.0–9.2 | 3.5 | Do. |

Results after setting overnight: Nos. 2, 3, and 4 —pH=4.0 for all three and the gel broke back.

EXAMPLE NO. 2

*Mannitol and d-Sorbitol Experiment (pH Adjusted)*

| Test No. | Percent Mannitol | pH adjusted to— | Percent buffer Added | Results |
|---|---|---|---|---|
| 1 | 0.0 | 7.5 | 0.1 | Did not gel. |
| 2 | 0.1 | 7.5 | 0.1 | Good gel. |
| 3 | 0.2 | 7.5 | 0.1 | Do. |

| Test No. | Percent d-Sorbitol | pH adjusted to— | Percent buffer Added | Results |
|---|---|---|---|---|
| 1 | 0.0 | 7.5 | 0.1 | Did not gel. |
| 2 | 0.1 | 7.5 | 0.1 | Good gel. |
| 3 | 0.2 | 7.5 | 0.1 | Do. |

($NaH_2PO_4$—$2H_2O$) was added to buffer and adjust the pH to 7.5. Results after setting overnight: gels in both sets of samples broke back.

EXAMPLE NO. 3

Since mannitol and d-sorbitol seem to give the same results, only d-sorbitol was used in this experiment.

0.1% borax (100 mls.—pH=9.2)+1% guar gum for each sample.

*d-Sorbitol Experiment (pH Not Adjusted)*

| Test No. | Percent d-Sorbitol | Results |
|---|---|---|
| 1 | 0.1 | Did not gel. |
| 2 | 0.3 | Good gel. |
| 3 | 0.5 | Do. |
| 4 | 0.7 | Do. |
| 5 | 1.0 | Do. |

Results after setting overnight:
Test No.:
2—pH=7.7, gel thinned, but did not completely break back.
3—pH=7.5, gel thinned, but did not completely break back.
4—pH=7.2, gel thinned, but did not completely break back.
5—pH=6.9, gel thinned, but did not completely break back.

EXAMPLE NO. 4

*d-Glucose Experiment (pH Adjusted)*

| Test No. | Percent d-Glucose | pH adjusted to— | Percent buffer Added | Results |
|---|---|---|---|---|
| 1 | 0.0 | 7.6 | 0.1 | Did not gel. |
| 2 | 0.1 | 7.6 | 0.1 | Do. |
| 3 | 0.3 | 7.6 | 0.1 | Formed a thin lumpy gel. |
| 4 | 0.5 | 7.6 | 0.1 | Formed a viscous gel, but it was lumpy. |
| 5 | 1.0 | 7.6 | 0.1 | Good gel. |
| 6 | 2.0 | 7.6 | 0.1 | Do. |
| 7 | 3.0 | 7.6 | 0.1 | Do. |

Results after setting overnight:
Test No.:
3—pH=7.3, gel appeared to have broken back.
4—pH=7.2, gel appeared to have broken back.
5—pH=7.2, gel appeared to have broken back.
6—pH=7.1, gel appeared to have broken back.
7—pH=7.0, gel appeared to have broken back.

EXAMPLE NO. 5

*d-Glucose Experiment (pH Not Adjusted)*

| Test No. | Percent d-Glucose | Results |
|---|---|---|
| 1 | 1.0 | Did not gel. |
| 2 | 1.5 | Do. |
| 3 | 2.0 | Do. |
| 4 | 3.0 | Do. |
| 5 | 4.0 | Good gel. |
| 6 | 5.0 | Do. |

After sample numbers 5 and 6 had formed good smooth gels, 0.4% of buffer was added to each. After twenty-four hours the gels broke back and the pH=6.8 for both.

EXAMPLE NO. 6

*Glycerol Experiment (pH Adjusted)*

| Test No. | Percent Glycerol | pH adjusted to— | Percent buffer Added | Results |
|---|---|---|---|---|
| 1 | 0.0 | 7.5 | 0.1 | Did not gel. |
| 2 | 1.0 | 7.5 | 0.1 | Do. |
| 3 | 1.5 | 7.5 | 0.1 | Good gel. |
| 4 | 2.0 | 7.5 | 0.1 | Do. |
| 5 | 3.0 | 7.5 | 0.1 | Do. |

Results after setting overnight:
Test No.:
3—pH=7.0, gel broke back.
4—pH=7.0, gel broke back.
5—pH=7.0, gel broke back.

EXAMPLE NO. 7

*Glycerol Experiment (pH Adjusted)*

| Test No. | Percent Glycerol | Results |
|---|---|---|
| 1 | 1.5 | Did not gel. |
| 2 | 2.0 | Do. |
| 3 | 3.0 | Do. |
| 4 | 4.0 | Good gel. |
| 5 | 5.0 | Do. |
| 6 | 6.0 | Do. |
| 7 | 7.0 | Do. |

After sample numbers 4, 5, 6, and 7 had formed good gels, 0.4% of buffer was added to each. Twenty-four hours later the gels had broken back. The pH of each was as follows:

Test No.:
4—pH=6.80.
5—pH=6.75.
6—pH=6.75.
7—pH=6.70.

EXAMPLE NO. 8

*Dulcitol Experiment (pH Adjusted)*

| Percent Dulcitol | pH before Buffering | pH after Buffering | Percent Buffer | Results |
|---|---|---|---|---|
| 0.0 | 9.2 | 7.6 | 1.0 | No gel. |
| 0.1 | 9.2 | 7.6 | 1.0 | Good gel. |
| 0.2 | 9.2 | 7.6 | 1.0 | Do. |
| 0.3 | 9.2 | 7.6 | 1.0 | Do. |

After setting overnight: pH=6.0 for #2, 3 and 4. The gel thinned considerably, but did not completely break back.

*Dulcitol Experiment (pH Not Adjusted)*

| Test No. | Percent Dulcitol | Results | pH After Setting Overnight |
|---|---|---|---|
| 1 | 0.1 | No gel | Did not measure. |
| 2 | 0.3 | do | Do. |
| 3 | 0.5 | Good gel | 7.0. |
| 4 | 0.7 | do | 6.5. |
| 5 | 1.0 | do | 6.5. |

Numbers 3, 4 and 5 thinned a little after setting overnight, but did not break back.

These data indicate that dulcitol reacts and gives the same results as mannitol and sorbitol.

The experimental data indicates that adjustment of the pH allows the use of smaller amounts of the complexing agents. It also indicates that the borate waters can be made to gel on the basic side by using the complexing agents. The borate-gum gelled systems seem to break back normally when a breaker, such as sodium di-H ortho phosphate is added.

In comparing the effectiveness of the different complexing agents, it is noted that mannitol and sorbitol have practically the same effect.

Ammonium bifluoride appears to be as good a complexing agent as mannitol and sorbitol. Glycerol and glucose seem to be of equal effectiveness; however, neither of them are as effective as mannitol, sorbitol and ammonium bi-fluoride.

While particular embodiments of the invention have been described, it will be understood, of course, that the invention is not limited thereto since many modifications may be made, and it is, therefore, contemplated to cover by the appended claims any such modifications as fall within the true spirit and scope of the invention.

The invention having thus been described, what is claimed and desired to be secured by Letters Patent is:

1. A method of preparing a gelled aqueous fluid from a borate water, comprising the steps of:
   (a) adding to said borate water a compound selected from the group consisting of polyhydroxy alcohols, monosaccharides, alkali metal fluorides, and ammonium fluorides, which forms a water soluble complex with the borate in said water in an amount which is at least equal on a chemical equivalent basis to the amount of the borate present in the borate water; and thereafter,
   (b) adding to the resulting mixture a gum which tends to hydrate in the presence of water in an amount sufficient to form a gel characterized further in that the stability of the water soluble borate complex is sufficiently strong that the formation of a gum-borate complex is substantially prevented.

2. The method of claim 1 wherein the compound forming a water soluble complex with the borate is an alkali metal fluoride.

3. The method of claim 1 wherein the compound forming a water soluble complex with the borate is ammonium bifluoride.

4. The method of claim 1 wherein the compound forming a water soluble complex with the borate is mannitol.

5. The method of claim 1 wherein the compound forming a water soluble complex with the borate is d-sorbitol.

6. The method of claim 1 wherein the compound forming a water soluble complex with the borate is d-glucose.

7. The method of claim 1 wherein the compound forming a water soluble complex with the borate is glycerol.

8. The method of claim 1 wherein the compound forming a water soluble complex with the borate is dulcitol.

9. The method of claim 1 wherein the gum employed is guar flour.

10. A method of preparing a gelled aqueous fluid from a borate water having a borate concentration of not more than about 1.0% and having a pH of at least 8.0, comprising the steps of:
    (a) adding a buffering agent to said borate water whereby the pH thereof is adjusted to a value within the range of 7.0 to 8.0;
    (b) adding to the buffered borate water a compound selected from the group consisting of polyhydroxy alcohols, monosaccharides, alkali metal fluorides and ammonium fluorides, which forms a water soluble complex with the borate in said water in an amount which is at least equal on a chemical equivalent basis to the amount of the borate present in the borate water; and thereafter,
    (c) adding to the resulting mixture a gum which tends to hydrate in the presence of water in an amount sufficient to form a gel characterized further in that the stability of the water soluble borate complex is sufficiently strong that the formation of a gum-borate complex is substantially prevented.

11. The method of claim 10 wherein the buffering agent is sodium dihydrogen orthophosphate.

12. A method of preparing a gelled aqueous fluid from a borate water, comprising the steps of:
    (a) adding to said borate compound a polyhydroxy alcohol, which forms a water soluble complex with the borate in said water, in an amount which is at least equal on a chemical equivalent basis to the amount of the borate present in the borate water; and thereafter,
    (b) adding to the resulting mixture a gum which tends to hydrate in the presence of water in an amount sufficient to form a gel characterized further in that the stability of the water soluble borate complex is sufficiently strong that the formation of a gum-borate complex is substantially prevented.

13. A method of preparing a gelled aqueous fluid from a borate water, comprising the steps of:
    (a) adding to said borate compound a monosaccharide, which forms a water soluble complex with the borate in said water, in an amount which is at least equal on a chemical equivalent basis to the amount of the borate present in the borate water; and thereafter,
    (b) adding to the resulting mixture a gum which tends to hydrate in the presence of water in an amount sufficient to form a gel characterized further in that the stability of the water soluble borate complex is sufficiently strong that the formation of a gum-borate complex is substantially prevented.

References Cited in the file of this patent

UNITED STATES PATENTS 2,681,704    Menaul _____ June 22, 1954

OTHER REFERENCES

Deuel et al.: The Reaction of Boric Acid and Borax With Polysaccharides, article in Die Makromolekulare Chemie, Vol. 3, 1949, pp. 13 to 30.

Haug: Guar Mannogalactan Studies, article in Tappi, Vol. 36, No. 1, January 1953, pp. 53 to 58.

UNITED STATES PATENT OFFICE
CERTIFICATE OF CORRECTION

Patent No. 3,096,284                          July 2, 1963

Ralph L. Slate

It is hereby certified that error appears in the above numbered patent requiring correction and that the said Letters Patent should read as corrected below.

Column 4, heading to the table in EXAMPLE NO. 7, for "Glycerol Experiment (pH Ajusted), in italics, read -- Glycerol Experiment (pH Not Adjusted) --, in italics.

Signed and sealed this 31st day of December 1963.

(SEAL)
Attest:
ERNEST W. SWIDER

Attesting Officer

EDWIN L. REYNOLDS

Acting Commissioner of Patents